United States Patent [19]

Isaac et al.

[11] 4,028,133

[45] * June 7, 1977

[54] REDUCED CHARGE MONTMORILLONITE PIGMENT FOR SENSITIZING RECORD MATERIAL

[75] Inventors: Peter A. H. Isaac, Summit; T. Dixon Oulton, Watchung, both of N.J.

[73] Assignee: Engelhard Minerals & Chemicals Corporation, Menlo Park, N.J.

[ * ] Notice: The portion of the term of this patent subsequent to Nov. 23, 1993, has been disclaimed.

[22] Filed: Apr. 5, 1976

[21] Appl. No.: 673,596

Related U.S. Application Data

[63] Continuation-in-part of Ser. No. 648,163, Jan. 12, 1976.

[52] U.S. Cl. .............................. 106/288 B; 106/72; 427/146; 427/215; 428/331; 252/454
[51] Int. Cl.$^2$ ............................................. C09C 1/42
[58] Field of Search .......... 106/288 B, 72; 427/146, 427/215; 428/331; 252/454

[56] References Cited
UNITED STATES PATENTS

| | | | |
|---|---|---|---|
| 3,395,029 | 7/1968 | Bizzarri | 106/72 |
| 3,622,364 | 11/1971 | Sugahara et al. | 106/288 B |
| 3,753,761 | 8/1973 | Sugahara et al. | 106/288 B |
| 3,915,731 | 10/1975 | Sugahara et al. | 106/72 |

*Primary Examiner*—Winston A. Douglas
*Assistant Examiner*—J. V. Howard
*Attorney, Agent, or Firm*—Melvin C. Flint; Inez L. Moselle

[57] ABSTRACT

A reduced charge montmorillonite pigment useful as a color-former in record material, especially pressure-sensitive carbonless copying record systems. The pigment is produced by replacing exchangeable cations of a selected dioctahedral montmorillonite crude clay (exemplified by certain bentonite clays) with a predetermined amount of lithium ions, mildly heating the lithium-exchanged montmorillonite to collapse irreversibly the montmorillonite structure, and grinding the heat-treated material to pigment-size particles, the grinding preferably being carried out in a fluid energy mill. When the pigment particles are coated on paper, the coated sheets produce stabilized intense images when printed with a solution of crystal violet lactone (CVL) dye precursor and thus may be used in record material with CVL without employing secondary slow acting dyes such as benzoyl leuco methylene blue. The sheets are also useful with other colorless or substantially colorless dye precursors.

14 Claims, No Drawings

4,028,133

REDUCED CHARGE MONTMORILLONITE PIGMENT FOR SENSITIZING RECORD MATERIAL

COPENDING APPLICATIONS

This application is a continuation-in-part of Ser. No. 648,163, filed Jan. 12, 1976.

BACKGROUND OF THE INVENTION

1. Field of the Invention

This invention relates to inorganic pigments used to sensitize dye precursors in so-called "carbonless copying record" systems, in particular those systems which employ an electron donor-acceptor reaction between particles of a solid electron acceptor distributed on image-receiving substrates and an organic solution of a colorless or substantially colorless basic dye precursor on transfer substrates. The invention is directed to the provision of an improved reactive inorganic pigment which is capable of developing solutions of basic dye precursors such as crystal violet lactone which normally form fugitive images when sensitized with prior art acidic inorganic pigments. In particular, the invention is concerned with a method for processing dioctahedral montmorillonite crude clay to produce novel sensitive inorganic pigments for use in record material, the novel pigments being members of the class of materials referred to as "reduced charge montmorillonites" or "reduced charge bentonites."

Several varieties of commercial carbonless copying paper utilize the chemical reaction between particles of a solid acid and a colorless or substantially colorless basic chromogenic compound to form a printed image. In the early stages of the development of carbonless copying paper systems, the image-developing receiving members were provided by applying an aqueous coating composition containing a paper coating adhesive and particles of attapulgite clay, a unique clay material. These CF members were assembled with transfer members coated with an encapsulated oily solution containing both a primary dye precursor, crystal violet lactone (CVL), and a secondary dye precursor, benzoyl leucomethylene blue (BLMB). Reference is made to U.S. Pat. No. 3,330,691 to Adams et al. Upon application of printing pressure to the assembly, the capsules ruptured and their contents were adsorbed on the clay particles disseminated on the CF sheets. As a result of an electron donor-acceptor reaction between acidic sites on the particles of attapulgite clay and the CVL, a dark blue mark was formed essentially instantaneously. This image faded rapidly and was replaced when the more slowly reacting BLMB was converted to colored (blue) form by a combined hydrolysis-oxidation mechanism. One of the problems with this type of record material was that the receiving sheets tended to lose sensitivity to the dye precursors during storage. Another was that the receiving sheets lacked the whiteness and brightness of conventional printing paper. Furthermore, aqueous suspensions of attapulgite clay were highly viscous and conventional high speed paper coating techniques could not be used.

The necessity for using both primary and secondary dyes also had obvious defects. The use of the secondary dye added to the cost of manufacturing the carbonless copying paper and it necessitated careful balancing of the relative proportions of primary and secondary dyes to assure that an image was present during the transition between fade of the CVL and full development of the BLMB. However, even with judicious selection of proportions of the dye precursors, color changes were evident throughout the life cycle of the developed sheets.

Some but not all of the drawbacks of the attapulgite pigment system have been obviated by sensitizing sheets with a pigment obtained by leaching a dioctahedral montmorillonite clay with mineral acid. The acid treatment of the crude clay increases the intensity of the image developed by CVL and it converts the clay from a material having rheological characteristics completely unsuitable for paper coating to a product which can be coated at higher solids than the attapulgite pigment. Acid-treated dioctahedral montmorillonite, exemplified by the product supplied under the tradename "Silton," has supplanted attapulgite clay as the most widely used inorganic pigment sensitizer for carbonless copying paper. It is well-known, however, that CVL produces a fugitive image when developed on acid-treated dioctahedral montmorillonite such as Silton and, as shown in U.S. Pat. Nos. 3,622,364 and U.S. 3,753,761 to Sugahara et al, BLMB must be used along with the CVL. Even when using this dye precursor combination, there is a considerable change in color in the printed sheets since CVL fades from deep blue to green when it is developed on "Silton." Certain solutions of carbinol dye precursors have been shown (South African Patent 72/1193 to Baxter) to produce essentially stable images on montmorillonites leached with sufficient acid to increase the hydrated silica content and to destroy partially the mineral lattice. Examples of such solutions are those obtained by dissolving Michler's hydrol, derivatives of Michler's hydrol such as the benzyl ether and morpholino compounds in polar solvents of low volatility. According to the teachings of the South African patent, the dyes are stabilized by penetration of the solution into the lattice of the mineral structure. To the best of our knowledge, however, acid-leached montmorillonites capable of producing stable images with CVL are unknown and, further, the rheological properties of coating mixtures prepared using sufficiently high contents of such pigments to give adequate imaging performance are only marginally adequate for use with conventional high-speed blade coating techniques for coating paper webs.

A wide variety of other inorganic pigments has been proposed for use in carbonless copying paper and many have been reported to produce images of high intensity when placed in absorptive contact with solutions of basic chromogens such as CVL. Among such pigments are: hydrothermally treated kaolin clay (U.S. Pat. Nos. 3,223,546 and 3,226,252 to Hemstock; 3,723,174 to Swanson et al; 3,736,285 to Miller); acid-leached calcined clays such as kaolin, montmorillonite or attapulgite (British Patent 1,307,319); clays such as the aforementiioned calcined above 200° C., preferably between 500° to 700° C. (French Patent 1,589,266 to Hayashi et al); and lattice-expanded kaolinite (U.S. Pat. No. 3,520,719 to Horton). Insofar as we are aware, none of these pigments reacts with CVL to produce images that are sufficiently resistant to fade to be useful with transfer sheets prepared with CVL without secondary dye precursors. In this regard, it is noted that binders and dispersants used in paper coating compositions (coating colors) generally adversely affect pigment sensitivity. Therefore, pigments which are promising as image-formers when tested in cake form may be entirely unsatisfactory when formulated into coating colors and coated on paper.

An increasing amount of the carbonless copying paper that is being supplied to the market is based on the use of a solic acidic resin, usually a phenolic resin. The phenolic resins, although expensive, may be used at low levels since they are very reactive and are normally made into coating mixtures with large quantities of kaolin coating clay, hence the designation "K-P" or kaolin-phenolic system. The rheological properties are therefore good and high solids blade coating is possible. Certain K-P sheets produce images of acceptable stability with CVL and thus BLMB or other slowly reacting secondary dyes may be excluded from the system. However, the resins are stringent in their requirement of the precursor solvent, which must also be a solvent for the resin. The original and most suitable solvents in this regard were chlorinated aromatic hydrocarbons. A measure of the stringency of the requirement on solvents is the fact that since the chlorinated aromatics were banned for use in this application, no equivalent substitutes have been discovered. Solvents commonly used in current practice are mixtures of aliphatic, alicyclic and/or aromatic hydrocarbons, which perform adequately in this respect but are not as suitable as the chlorinated aromatics. Furthermore, the resins become oxidized and polymerized to give quinones and other products, and the coated sheets generally turn yellow and develop an offensive odor on storage. In addition, they may cause frequent washups on offset presses due to their partial solubility in alcohol-containing fountain solution, resulting in resin buildup on the press. Furthermore, the resin-coated sheets may not be used as broke on a paper machine due to the presence of the resins.

2. Prior Art

The term "reduced charge montmorillonites," as described in literature, embraces a series of montmorillonites of progressively lower charge, as determined by lattice expansion characteristics and quantity of exchangeable monobasic cations. Members of the series are obtained by exchanging exchangeable cations of dioctahedral montmorillonite with various amounts of lithium cations, followed by mild heat treatment to collapse the mineral lattice and fix the exchanged lithium cations (render lithium ions non-exchange-able). A rationale for the development of the unique properties of reduced-charge montmorillonites has been provided in the literature, specifically by G. W. Brindley and G. Ertem, CLAYS & CLAY MINERALS, 1971, Vol. 19, pages 300 to 404; G. Ertem, ibid, 1972, Vol. 20, pages 199 to 205; and R. Calvet and R. Prost, ibid, 1971, Vol. 19, pages 175 to 186. It appears that on heating, part of the lithium migrates from the interlayer space into vacancies in the octahedral layer of the mineral lattice, whereby the negative charge on the mineral lattice decreases by one unit for each lithium ion which migrates. Since in a montmorillonite the lattice possesses a negative charge which balances the positive charge of the interlayer exchangeable cations, this negative charge is thereby reduced by those lithium cations which become "fixed" to the lattice. Hypothetically, this reduction of charge reduces the electric field in the interlayer region, and thus reduces the tendency of the mineral lattice to expand by adsorption of highly polar liquids into that space, but increases its affinity for less polar liquids. In addition, part of the lithium is said to react with lattice hydroxyl groups to produce protonic acidity on the surface of the mineral and in the inter-layer space. Evidence for this is given in the literature cited. To the best of our knowledge, reduced charge montmorillonite has no practical utility. Insofar as we are aware, the material as produced for scientific evaluation is in the form of chunks which would not be useful as a coating pigment and we know of no suggestion for employing such material in a form useful for such purpose.

U.S. Pat. No. 3,674,521 to Noble discloses that treatment of kaolin clay with ions such as lithium ions followed by a mild heat treatment results in a kaolin clay coating pigment having reduced viscosity. Included in the disclosure is a description of the use of such a process with kaolin clay including an unspecified amount of a montmorillonite impurity. The patent to Noble is not concerned with the provision of sensitized coatings for developing dye precursors. At any rate, we have found that such treatment of kaolin clay does not result in a pigment useful for sensitizing recording material for printing with CVL solutions.

THE INVENTION

A general object of our invention is to provide a novel sensitized inorganic pigment which possesses the desirable image-developing characteristics of resin-based sensitizers without their undesirable properties. A more specific object is to provide a mineral-based inorganic dye-forming pigment that obviates defects of prior art mineral-based pigments. A primary objective is to provide a pigment which produces intense relatively stable images with CVL and does not require the use of secondary dye material. Still another object is to provide a pigment that is useful with other commercially used dye precursor systems.

Other objects and features of the invention will be apparent from the description which follows.

The essence of our invention resides in the production of a pigment sensitizer from dioctahedral montmorillonite clays by replacing exchangeable cations of a carefully selected dioctahedral montmorillonite crude clay with a predetermined quantity of lithium ions, followed by heat treatment at a temperature sufficient to collapse irreversibly the lattice structure of the dioctahedral montmorillonite (as evidenced by a basal planar spacing in the range of 9.4A to 10.7A. which does not increase upon exposure to saturated water vapor) and then subjecting the heat-treated clay to ultrafine grinding, preferably by fluid energy grinding. The novel pigments that are produced constitute members of a group of synthetic materials known as reduced charge montmorillonites. They may be used as the sole pigments in the production of receiving sheets for record material or they may be mixed with kaolin clay and/or calcium carbonate, preferably a mixture of kaolin clay and calcium carbonate.

Mixed layer (partially dioctahedral and partially trioctahedral) smectites may also be used in the practice of the invention. However, only the dioctahedral portion may be reduced in charge as described herein and as a result the performance of reduced charge products prepared from mixed layer smectites is reduced depending upon the proportion of trioctahedral lattice present. Similarly in the case of interstratified materials containing other smectite components such as chlorite and mica in addition to dioctahedral montmorillonite lattice, the charge reduction treatment is only feasible for that part of the lattice which is of dioctahedral montmorillonite type, and therefore in such instances the performance of the products prepared from mixed-layer smectites is reduced depending on the proportion of non-montmorillonite lattice present. It will be understood that such materials are included whenever the term reduced charge montmorillonite is used herein.

An essential feature of the invention resides in the use of a montmorillonite having a reduced charge as a result of lithium exchange and heat treatment. The negative charge of dioctahedral montmorillonite may also be reduced by ion exchange with potassium, hydrogen or ammonium cations, followed by thermal treatment which is carried out at higher temperatures than will suffice to collapse the lattice when lithium is employed. However, it has been found that products obtained by such procedures do not possess the desirable spectrum of properties characterizing pigments within the scope of the invention. Another essential feature resides in utilizing a finely ground form of such material. A material in the aggregate state, which is the condition of reduced charge montmorillonite of the prior art, would not be useful as a coating pigment and, furthermore, the ultrafine grinding such as that which takes place during fluid energy milling, increases significantly both the imaging performance and the brightness of the material.

Coatings containing the reduced charge montmorillonite pigment may be used either in the "CF" (coated front) or the "CFB" (coated front and coated back) sheets of simple or multiple business forms. The benefits associated with the use of reduced charge montmorillonite pigment can also be realized when it is employed in various embodiments of well-known self-supported, pressure sensitive record material wherein a solution of dye precursor(s) and reactive pigment particles are on the same side of a member of record material and are normally separated by barrier material. For example, a coating composition containing the reduced charge montmorillonite can be superimposed on a previously deposited coating of an encapsulated solution of basic chromogen or vice versa. Similarly, the chromogenic material and pigment particles can be applied in a single coating with a suitable barrier material separating them. Colorless basic chromogens such as CVL are also employed in heat sensitive record material and the pigment of the invention can be employed to develop stable images with dye solutions transferred to particles of reduced charge montmorillonite by application of heat. Other obvious modifications and variations will be apparent to those skilled in the art.

Substrates sensitized with the particles of reduced charge montmorillonite of this invention are of especial benefit in carbonless copying paper systems based on CVL which do not include BLMB or similar slowly developing secondary dye precursors because these dye systems are relatively inexpensive and are available commercially.

Substrates sensitized with the pigment of the invention produce blue colored images from CVL which have a high initial intensity and fade resistance substantially superior to that of images developed on substrates sensitized with other inorganic pigments such as acid-leached montmorillonites and attapulgite clay. The substrates provide CVL stability and image hue shift comparable to that of curently available resin-coated sheets. When the reduced charge montmorillonite is mixed with 30 to 40% kaolin clay, substrates havng acceptable image-developing characteristics may be produced using coating colors having in excess of 50% solids. This is lower than the solids which can be used when coating with the kaolin-resin system but it is higher than the coatings which can be prepared with other inorganic pigments that have been commercially employed in carbonless copying paper systems. Especially preferred are blends of the pigment with about 20% of calcium carbonate and about 10% kaolin since such blends have exceptionally good imaging performance and desirable rheological properties.

Paper sheets coated with the novel pigment of the invention avoid the degradation, solubility and broke problems of the resin systems while permitting more economical coating and a savings by elimination of secondary dyes required with the commercial acid-treated montmorillonite/ CVL-BLMB system. Moisture resistance is generally sightly inferior to resin systems, but is superior to systems based on acid-treated montmorillonite/ CVL-BLMB.

Pigments of the invention have been found to be useful in sensitizing receiving sheets for carbonless copying systems other than those based on solutions of CVL as the sole chromogen. By way of example, the substrates are useful with mixtures of CVL and BLMB, as well as commerically used mixtures of CVL with proprietary precursors of red, green, black and other blue dyes. Excellent results were achieved with a commercial CB sheet containing a proprietary acid developing color precursor which does not possess a lactone structure. Thus, substrates sensitized with particles of the reduced charge montmorillonite pigment possess the advantage of being suitable for most commerical carbonless copying systems (excluding those which do not employ basic dyes and acidic co-reactants, such as those which develop color by metal ion complexation). This is not true of substrates sensitized with acid-treated dioctahedral montmorillonite (because of limitatons in its dye performance) or of resin systems (because of limitations on solvents).

Published properties of reduced charge montmorillonites led us to expect that a pigment of such composition would possess better rheological properties than untreated montmorillonite clay. Also, they led us to speculate that the pigment might possible stabilize images formed from CVL dye precursor solutions by penetration within the lattice in spite of the fact that hydrocarbon solvents used with the dye precursors are of considerably lower polarity than those described in the literature. However, information obtained by X-ray testing indicated that a solution of CVL in a commercially used CB solvent does not penetrate the lattice of the reduced charge montmorillonite. Evidence of dye penetration also was not apparent when the pigment was tested with a commercial CB precursor solution containing a proprietary non-lactone dye precursor. In the absence of evidence for such a mechanism of image stabilization, the information available in the literature fails to provide a plausible explanation for the unique imaging performance of the pigment. Thus, the mechanism by which the pigment stabilizes dyes such as CVL is not presently understood nor can be explain the marked superiority over acid-treated montmorillonite clay such as Silton with respect to stabilizing CVL.

DETAILED DESCRIPTION

The term "dioctahedral montmorillonite" as used herein refers to species of three-layer lattice silicates of the ideal formula $Al_{(2-x)}MG_xSi_4O_{10}(OH)_2$ under the subgroup of dioctahedral smectities of the group of smectite minerals. The base-exchangeable cations associated with dioctahedral montmorillonites are usually $Na^+$, $Ca^{++}$, $Mg^{++}$. In some cases $H^+$ or $K^+$ are associated with such minerals. Rarely is exchangeable $Li^+$ present in significant amount. The term "hydrated silica" refers to non-crystalline (amorphous silica) which, unlike crystalline silicon dioxide and silicate minerals, is readily soluble in dilute sodium carbonate solution. Hydrous silica is determined by the molybdenum blue colorometric method described by T. D. Oulton "ENCYCLOPEDIA OF INDUSTRIAL CHEMICAL ANALYSIS " Volume 10, page 115, published by John Wiley & Sons, Inc. (1970). Free moisture (F.M.) and loss on ignition (L.O.I.) are analyzed by the procedure described at pages 111 to 113 using a temperature of 1800° F. to determine L.O.I. Chemical assays are made by methods detailed at pages 115 to 130. Lithium is analyzed by atomic absorption. G.E. brightness is measured using a G.E. brightness meter according to a modification of the procedure of TAPPI Standard T452-M-58; the modification comprises pulverizing the sample once to pass through a .020 inch screen as opposed to three times through a 0.035 inch screen as described in the standard procedure. Particle size values are determined by Sedigraph and correspond to those obtained by the conventional (Casagrande) method. A conventional X-ray diffraction technique, as described in U.S. Pat. No. 3,503,900 to Haden, was used to obtain diffraction patterns. Base exchange capacity is determined by the ammonium acetate method described in the Oulton publication at pages 110 to 111. . All base-exchange capacity values, as used herein, are expressed on the basis of the weight of the clay after heating to 1800° F., i.e., on a L.O.I.-free weight basis.

PREPARATION OF THE PIGMENT

Those bentonites and sub-bentonites in which dioctahedral montmorillonite is the predominant mineral are useful in practice of the invention. These include the swelling bentonites such as Wyoming bentonites in which sodium is the major base-exchangeable cation and the nonswelling sub-bentonites such as certain Texas and Georgia bentonites in which calcium or magnesium is the major base-exchangeable cation. As previously indicated, smectites with mixed-layer structure, part of which corresponds to this definition of a dioctahedral montmorillonite lattice, may also be used. Treatment of kaolin clay resulted in a pigment that produced a very weak, unacceptable image when printed with CVL.

Widely varying montmorillonites (in terms of octahedral cations, exchangeable cations, layer charge and associated impurities) all produce minerals with the desired properties when treated with a suitable amount of a lithium salt, followed by heat treatment. However, trioctahedral smectite minerals such as saponite and hectorite are not useful in the practice of the invention although mixed-layer materials containing a relatively small proportion of structures of this type may be useful provided the proportion of the structure which is of a dioctaheral montmorillonite type is sufficiently great.

In carrying out our invention, the exchange treatment should be applied to a naturally-occurring dioctahedal montmorillonite or to a clay rich in such mineral having a high enough brightness to produce an aesthetically pleasing coated clay sheet. Preferably the starting clay should have a G.E. brightness of at least 60%, more preferably 70% or above. However, clays having lower brightnesses can be usd if a bleach treatment (e.g., conventional hydrosulfite bleaching) is included during processing. Experience to date indicates that it is preferable to emmploy a clay that has a low content of hydrated silica impurity. Hydrated silica may be removed or reduced in amount by leaching the crude clay with a dilute solution of sodium carbonate before futher processing. When hydrated silica was present in appreciable amount, for example in excess of 5 to 7% based on the L.O.I.-free weight of the crude, the pigment products lacked the ability to form fade-resistant images with CVL. Montmorillonite clays high in hydrated silica include naturally acid-leached crude clays and artificially acid-leached clays such as Silton which is not benefited by lithium exchange and heat treatment. Crude clays are frequently contaminated with carbonate minerals such as calcite. Such clays may be used in practice of the invention although in some cases the reduced charge montmorillonite product may produce less fade resistant images than similar clays without appreciable carbonate impurity. Iron impurities, as well as many organic impurities, have an adverse effect on the brightness of clays with which they are associated. Selection of a crude low in such impurities favors the production of a bright pigment product without the added expense of one or more bleaching steps. Preferably clays containing more than 70% dioctahedral montmorillonite are employed. Especially preferred are clays containing more than 80% dioctahedral montmorillonite. Clays containing about 90% or more dioctahedral montmorillonite are particularly preferred. Similar criteria apply in the case of the mixed-layer materials previously discussed.

The reduced charge montmorillonite pigments employed in carrying out the invention are obtained by exchanging exchangeable cations of dioctahedral montmorillonite with a controlled amount of lithium ions. When the reduced charge montmorillonite in which the extent of lithium exchange is too low, the image intensity will not be strong enough. At an even lower level of lithium exchange, the heat treatment subsequently described does not result in a collapse of the lattice structure. As a result such materials are subjected to lattice expansion when exposed to water or water vapor, and produce very viscous slurries and coating colors which are quite unsuitable for coating on paper. On the other hand, the brightness of the pigment decreases with increase in lithium content and, in some cases, fade resistance deteriorates. Also, processing expenses increase with increase in the exent of lithium exchange. Routine test procedures can be used to determne the optimum level of lithium addition for any given starting material.

It is known from the literature that more lithium enters the lattice of dioctahedral montmorillonite than corresponds to the base exchange capacity and there is evidence that some of the lithium reacts with clay hydroxyl groups, in addition to going onto exchange sites. Thus, to produce the pigments useful in the practice of the invention, the amount of lithium ions introduced to the clay may exceed the base exchange capacity, while at the same time the fraction of exchange sites occupied by lithium ions may be less than one; i.e., the clay may not be totally in the litium-exchanged form. Generally, the base exchange capacity varies in proportion to the content of dioctahedral montmorillonite in the clay. Useful clay crudes generally have base exchange capacities in the range of 50 to 120 meq./100 g. (L.O.-.I.-free weight basis), most usually in the range of 70 to 110 meq./100 g. (L.O.I. or loss on ignition is determined by heating the pigment to essentially constant weight at 1800° F).

Tests were carried out with crude clays containing 88% to 97% montmorillonite with base exchange capacities of about 78 meq./100 g. and 105 meq./100 g., respectively, for the montmorillonite components. It was found that optimum performance of the reduced charge montmorillonite was achieved in terms of pigment performance when lithium was exchanged to the extent of about 60 to 120 meq./100 g. based on the crude clay, correspondng to about 66 to 135 meq./100 g. based on the dioctahedral montmorillonite content. This represents 60 to 125% of the base exchange capacity. Especially preferred is addition of lithium to about 100% (e.g., 90 to 115%) of the base exchange capacity of the clay. Generally, the $Li_2O$ analysis of pigments of the invention will be in the range of 0.5% to 4% by weight, expressed on a L.O.I.-free weight basis. Especially preferred are pigments containing from about 0.8 to 3% by weight $Li_2O$ on an L.O.I.-free weight basis. In the case of the crude clay used in Example I, the best products in terms of imaging performance and sheet brightness contained 1.2% to 1.8% $Li_2O$ by weight. For reasons of economy in addition to those considerations cited above, the optimal material gave a $Li_2O$ analysis of about 1.4%.

In most cases, exchange of lithium ions for cations in the montmorillonite crude clay is very rapid and only short contact between the clay and a source of lithium ions is necessary. In some cases, exchange by lithium ions derived from salts such as the chloride is facilitated by adjustng pH to an alkaline value.

Any method whereby lithium ions are furnished to exchange sites is satisfactory for the production of the reduced charge montmorillonite and various sources of lithium ions may be used. Thus, exchange has been achieved, for example, by (1) mixing the clay in an aqueous solution of a lithium salt (chloride), filtering, washing and drying, (2) pugging the clay with a lithium salt (chloride, carbonate) and sufficient moisture to give convenient processing followed by drying; (3) exchanging the clay into the hydrogen form by treatment with acid, filtering and washing, followed by addition of water to the wet cake to form a slurry, adding an alkaline source of lithium ions such as lithium hydroxide or lithium carbonate, filtering, washing and drying; and (4) exchanging the clay into the hydrogen form (followed by filtration and washing), followed by addition of an alkaline source of lithium ions to the wet filter cake in a pugger with sufficient water to produce satisfactory mixing. The second or fourth procedures are presently preferred. It is to be understood that the essential aspect of this part of the process is to place lithium ions on the clay exchange sites, and this objective is not limited by the processes indicated above.

After any one of the treatments described above, or equivalent treatment, the lithium dioctahedral monrmorillonite is heated at a temperature high enough to collapse irreversibly the mineral structure but as low as possible to achieve this result. When temperature is too low, e.g., 125° C., the structure cannot be collapsed using reasonable durations of heating. On the other hand, when temperature is too high, e.g., appreciably above 300° C., the resulting pigment has undesirable coating properties and initial sensitivity and image fade resistance are adversely affected. Also, pigment brightness undesirably decreased. A lower limit of temperature appears to be in the area of 160° C. when the duration of heating is 24 hours. An upper temperature is about 300° C. Recommended are temperatures in the range of about 200° C. to about 250° C. for about 30 minutes to 24 hours. Especially preferred are temperatures in the range of about 220° C. to 250° C. for 1 to 4 hours.

Reduced charge montmorillonite, as synthesized, is in the form of chunk-like aggregates. It is essential to subject these aggregates to ultrafine grinding with optional classification before using the reduced charge montmorillonite in the production record material. Preferably ultrafine grinding is carried out in a fluid energy mill since this type of mill operates with dry material and a dry pigment may be supplied to the user. However, the material may be wet ground in sand mills or ball mills. Grinding may take place during production of a paper coating composition when ball mills are employed. Irrespective of the method used for ultrafine grinding, the aggregates discharged from the calciner, typically chunks about 1 inch in diameter, should be crushed in a mill such as a roller mill and then pulverized, typically to fineness such that the aggregates will pass through a 0.02 inch screen before being subjected to ultrafine grinding. The milled pigment product should be composed of particles essentially all of which are finer than 15 microns (e.s.d.) when measured by conventional sedimentation procedures. Preferably the particles are predominantly in the size range of ½ to 5 microns, with an average particle size typically in the range of 1 to 3 microns.

As mentioned, the preferred fine grinding method involves the use of a fluid energy mill. In such mills the particles to be ground are suspended in a stream of elastic fluid, usually air or steam, and the stream is moved at high velocity in a manner such that the particles collide. Particle size of the ground product can be varied by control of the velocity of elastic fluid, the feed rate of the material to be ground and adjustment of the moisture content of the feed material. Operation of a representative mill is described n U.S. Pat. 3,205,082 to Buffett. Fluid energy milling increases significantly the brightness of the reduced charge montmorillonite. Typically brightness is increased by about 5 to 10 points on the G.E. brightness scale.

THE REDUCED CHARGE MONTMORILLONITE PIGMENT AND PRODUCTION OF SHEETS SENSITIZED THEREWITH

Pigments of the invention are characterized as follows:

1. A conventional X-ray pattern exhibits a basal planar spacing at 9.4 to 10.7A., indicating a collapsed structure since dioctahedral montmorillonites have basal planar spacings in the range of 12A. to 15A., depending on the cations. Usually the best imaging and rheological behavior is obtained with pigments exhibiting a basal planar spacing at 9.6 to 10.0A. The basal planar spacing of the pigment does not increase when it is exposed to saturated water vapor, indicating that collapse of the lattice is irreversible.

2. The basal planar spacings of the pigments show a lattice expansion to about 17.3A. when ethylene glycol is used. This is also characteristic of dioctahedral montmorillonite.

3. The base-exchange capacity of the pigment, typically in the range of 20 to 50 meq./100 g, is significantly less than that of the precursor dioctahedral montmorillonite, this being attributable to fixation of lithium ions which are for the most part rendered non-exchangeable.

4. Free moisture (F.M.) of the pigment is low, typically 1 to 3% by weight, when measured by drying for about 16 hours at 105° C. This reflects the unusual hydrophobicity of the pigment. Free moisture of crude clays is generally above 7 to 8% by weight.

5. The pigments can be made down into dispersed aqueous slurries which exhibit susbstantially Newtonian rheology at solids levels of the order of 40%. The original montmorillonite and lithium exchanged intermediates produce gels when dispersed in water at low solids, e.g., 10%.

6. Representative samples have B.E.T. surface areas (nitrogen absorption method) in the range of 40 $m^2/g$. to 80 $m^2/g$. Prior art sensitive inorganic pigments for carbonless copying paper, in contrast, are characterized by higher B.E.T. surface areas. Thus, the acid leached montmorillonite clay of the Sugahara et al patents mush have a B.E.T. surface area above 180 $m^2/g$. and Silton clay has a surface area well above this minimum value. "Attasorb," a commercial attapulgite produce used as a sensitizer for record material, has a surface area of about 125 $m^2/g$.

7. Pigment brightness (G.E.) is at least 60%, and is preferably 65% or above.

By blending the pigment with up to 40% by weight of a coating grade of kaolin clay, rheology is improved and by including a calcium carbonate pigment such as "Albaglos," both rheology and imaging performance may be improved. The pigment may be blended with larger quantities of unreactive, low-viscosity pigments such as the kaolin and calcium carbonate described above, but as a result the imaging properties (in particular the intensity of the initial image) deteriorate as the percentage of active pigment in the mixture is reduced. This effect may be compensated for by the use of higher total coat weights, so that the quantity of reactive mineral coated on the sheet is not substantially reduced. At a coat weight of 3.5 to 5.5 lbs./3000 $ft.^2$, the maximum proportion of low viscosity pigments in the blend which may be permitted such that adequate imaging properties are maintained is in the region of 30 to 50% by weight. Recommended is a blend containing about 70 parts by weight reduced charge montmorillonite pigment, 10 parts by weight kaolin and 20 parts by weight calcium carbonate pigment. High brightness, low viscosity diluents such as hydrated alumina and titania may be mixed with the reduced charge montmorillonite pigment or with mixtures of this pigment with kaolin and/or calcium carbonate.

Conventional paper coating technology may be used for the production of receiving sheets sensitized with the reduced charge montmorillonite pigment. The pigment may be made down into a dispersed slurry by the paper coater using conventional clay dispersants and simple conventional mixing equipment such as a Cowles mixer. Conventional paper coating binders (adhesives) may be employed. Examples are starch, styrene-butadiene and latices, and mixtures thereof. However, the use of water soluble adhesives frequently results in a deterioration in the imaging properties of sheets coated with the pigment; as a consequence, latex-type adhesives are preferred. The pigment may be made up into paper coating compositions with up to about 45% solids when used as the sole pigment. When mixed with up to about 40% by weight with kaolin clay or calcium carbonate, coating colors of 50 to 55% solids may be obtained. The coatings may be applied by air knife, roll or reverse roll coating. With some coating color formulations, trailing blade coaters (U.S. Pat. No. 2,368,175 to Trist) may be employed. Receiving sheets having desirable qualities may have coat weights in the range of about 2 to 10, usually 3 to 5, pounds per 3000 square foot, depending on the nature and quantities of the pigment or pigments used, as discussed previously.

USE OF THE SENSITIZED SHEETS IN RECORD MATERIAL

These novel receiving sheets are useful in developing color by an electron donor-acceptor reaction with a variety of known dye precursors typified by crystal violet lactone, malachite green lactone, derivatives of Michler's hydrol, rhodamine B-lactone, derivatives of N-phenyl leucoauramine and spiro pyran lactones. These dye precursors may be used alone, in combination with each other or in combination with secondary (slow developing) dye precursors such as BLMB. Thus, receiving sheets of the invention have been useful with a variety of commercial CB sheets, a versatility not possessed by sheets sensitized with other inorganic pigments. Of prime importance, as mentioned above, is the fact that receiving sheets of the invention develop solutions of CVL in the common non-halogenated organic solvents and there is no need to employ secondary dyes.

It should be noted that not all acid-developing dyes may be stabilized against fade to such an extent that their fading characteristics when developed using the pigments of the invention are equivalent to those when developed using a K-P coated sheet. For instance, when used alone, the proprietary black dye precursor (mentioned above) is essentially stable in hue and possesses good resistance to decline in intensity (fade) when when developed using a K-P system. However, using the pigments of the invention, the fade is somewhat more rapid and is accompained by a hue change to a brick-red color. This process of fade and hue change is, however, much slower using the pigments of the invention than using any other known reactive pigment system. Furthermore, the above observations are the result of exposing images to light of normal intensity. It may be demonstrated (as described in Example I) that the effect of using more severe irradiation conditions (such as sunlight) is more adverse in the case of images formed on K-P sheets than for those formed using the pigments of the invention, i.e., at higher irradiation levels the pigments of the invention are improved in image stability relative to resin.

It should be noted further that the imaging performance of a CF system is affected, most notably in the areas of initial image intensity, speed of image development, fade resistance and desensitization, by the nature and amount of the materials encapsulatd in the CB coating. In particular, it may be demonstrated that image intensity and fade resisance vary considerably with the concentration of the dye precursor and with the nature of the solvent. As an example, CB sheets bearing microcapsules which contained CVL as the sole dye precursor, but using different proprietary solvent mixtures, were obtained from two companies engaged in the production of carbonless paper. These sheets were evaluated, using one of the pigments of Example III, in a CF coating at a coat weight of 5.5 lbs./3000 ft.². In one case the fade rate was of the same order as that on K-P CF sheets; in the other case the fade rate was less than half that of the image on K-P CF sheets, i.e., in this second case the CF coated with the pigment of the invention exhibited more than double the fade resistance of a commercial K-P CF sheet.

This effect serves to demonstrate that both optimum dye concentration as well as solvent chemistry are probably different in the case of the pigments of this invention from those which are optimum using K-P systems. This would be expected from the differeing requirements of the system. It has nevertheless been unequivocally demonstrated that within a wide range of precursor and solvent conditions, the pigments of the invention are clearly superior to pigments of the prior art when evaluated using the same CB system; and furthermore that if the CB conditions, notably the nature of the solvents, are correctly chosen, systems whose active component is one of the pigments of the invention are clearly superior to K-P systems currently available.

The following examples are given for illustrative purposes and are not to be considered as limiting the invention to the specific embodiments described therein.

The so-called Dewitt clay used in some of the illustrative examples was a crude Texas bentonite having a base-exchange capacity of about 81.7 meq./100 g. and containing about 88% dioctahedral montmorillonite in which exchangeable cations were predominantly alkaline earth metals. Surface area (B.E.T. nitrogen adsorption) was about 23 m²g. Following is a chemical analysis of a representative sample of the crude clay.

|  | Percent |
| --- | --- |
| Free moisture | 3.31 |
| Loss on ignition | 9.44 |
| L.O.I.-free basis: | |
| Total $SiO_2$ | 66.71 |
| Hydrated $SiO_2$ | 1.98 |
| Free $SiO_2$ | 7.06 |
| $Al_2O_3$ | 21.68 |
| MgO | 2.74 |
| $Fe_2O_3$ | 4.32 |
| $TiO_2$ | 0.27 |
| $CO_2$ | not found |
| CaO | 1.69 |
| $Na_2O$ | 1.07 |
| $K_2O$ | 0.78 |
| Base exchange | 81.7 meq./100 g. |
| Base exchange cations (as oxides): | |
| CaO | 1.45 |
| MgO | 0.39 |
| $Na_2O$ | 0.28 |
| $K_2O$ | 0.01 |

The so-called "Texas No. 1" bentonite crude used in other examples contained 91% dioctahedral montmorillonite. This crude clay had a base-exchange capacity of about 103.4 meq./100 g. Hydrated silica content (L.O.I.-free basis) was 4.26%. Following is a chemical analysis of a representative sample of the Texas No. 1 clay.

|  | Percent |
| --- | --- |
| Free moisture | 8.69 |
| Loss on ignition | 14.23 |
| L.O.I.-free: | |
| Total $SiO_2$ | 66.52 |
| Hydrated $SiO_2$ | 4.26 |
| Free $SiO_2$ | 3.00 |
| $Al_2O_3$ | 22.53 |
| MgO | 3.22 |
| $Fe_2O_3$ | 4.99 |
| $TiO_2$ | 0.26 |
| CaO | 1.42 |
| $Na_2O$ | 0.58 |
| $K_2O$ | 0.23 |
| Base exchange | 103.4 meq./100 g. |
| Base exchange ions | |
| Ca | 49.9 meq./100 g. |
| Na | 13.9 meq./100 g. |

EXAMPLE I

This example illustrates the preparation of a reduced charge montmorillonite pigment of the invention from a calcium bentonite and demonstrates the outstanding usefulness of the pigment in developing and stabilizing CVL in pressure-sensitive record material. In this example exchange with lithium ions was carried out using lithium chloride with ammonium hydroxide to adjust pH.

A. Preparation of Pigment

Five hundred grams (F.M.-free basis) of the Dewitt bentonite, previously dried at 180° F., crushed and pulverized through 0.020 inch screen mesh, was mixed with 1167 grams of water. The slurry was mixed under a drill press and 100 g. of lithium chloride was added with stirring. The pH of the slurry fell and was restored to 7.0 by the addition of ammonium hydroxide solution. The slurry was then mixed for 30 minutes and was screened through 100 mesh, 200 mesh and 325 mesh screens to eliminate undesirable grit. The screened slurry was then filtered and the wet cake was washed with 1200 ml. of water to remove salts. The cake was then allowed to air dry at room temperature and was then heated at 220° C. for 24 hours in a forced-draft oven to collapse the structure of the montmorillonite. The resulting material was roller milled, micropulverized and air jet mmilled in a "Micronizer" mill.

The resulting product had a nitrogen B.E.T. surface area of 47.9 m²/g. and a particle size distribution such that 82% of the particles had equivalent spherical diameters (e.s.d.) of 10 microns or less as measured by sedimentation, 50% less than 3 mu, and 15% less than 1 mu. qqThe basal (001) X-ray spacing obtained by oriented slide technique was 10.0A., indcating that the structure of the montmorillonite had collapsed. G.E. brightness was 66.9%. The pigment analyzed 1.25% $Li_2O$ on an L.O.I.-free weight basis. The amount of litium introduced was 83.3 meq./100 g., corresponding to 102% of the base exchange capcity of the crude clay.

B. Makedown of the Pigment in Coating Color and Preparation of Coated Receiving (CF) Sheets One hundred grams (on a moisture-free basis) of the product in part A. was made into a 40% solids slurry using appropriate water addition and mixing with a drill press at 800 r.p.m. The slurry pH was adjusted to 7.0 using 10% sodium hydroxide solution. Twenty grams of Dow 620 (styrene-butadiene latex supplied at 50% solids) was added to the mixture and the pH was raised to 11.0 using sodium hydroxide with slow mixing. The coating color so prepared was screened through 325 mesh and coated onNCR-Appleton basestock at 3.5 ± 0.2 lb./3000 ft.² coat weight using Meyer rods with hand drawdown. The sheets were dried on a polished drum at 220° F. and lightly calendered.

Imaging Performance of Receiving Sheets Coated With Pigment of the Invention

The CF sheets from part B. were "developed" by squeezing them with CB sheets coated with microcapsules containing dye precursor and solvent. These sheets contained crystal violet lactone as the sole color precursor and a typical solvent. combination.

The following test procdures were carried out to evaluate the experimental CF sheets. For the purpose of comparison, commercial kaolin-resin (K-P) coated CF sheets were evaluated by the same procedure.

1. An undeveloped mineral-coated sheet was measured on a Bausch & Lomb opacimeter using the white body as backing. Similar readings were obtained on a developed sheet. In each case the average of sixteen individual readings was taken. A "contrast ratio," being the average from the developed sheet divided by that from the undeveloped sheet, was calculated and expressed as a percentage.

2. This ratio was measured on test strips 30 seconds and 24 hours after development and the results termed "30 second initial sensitivity" and "24 hour initial sensitivity" respectively.

3. After the 24 hour reading, test strips were exposed to fluorescent light of normal room intensity and contrast ratios measured periodically. These results are referred to below as "board fade" readings.

The initial sensitivity and fade readings for experimental CF sheets sensitizied with the pigment of the invention and the referenceresin-coated strips are reported in Table I.

TABLE I

| | Experimental CF Sheets | Resin Coated CF Sheets |
|---|---|---|
| 30 second initial sensitivity | 68.9 | 65.0 |
| 24 hour initial sensitivity | 61.1 | 64.3 |
| 6 hour board fade | 61.5 | 64.7 |
| 1 day board fade | 65.1 | 67.4 |
| 2 days board fade | 65.6 | 68.9 |
| 3 days board fade | 68.2 | 70.4 |
| 6 days board fade | 70.8 | 73.5 |
| 7 days board fade | 72.0 | 74.1 |
| 10 days board fade | 75.2 | 76.2 |
| 13 days board fade | 77.9 | 79.0 |
| 17 days board fade | 77.6 | 78.5 |

It is apparent that CF sheets coated with the pigment of the invention gave superior 24 hour initial sensitivity (lower numbers) than the commercial resin-coated reference sheets and that upon fading through 17 days' exposure the experimental sheets still possessed the more intense image. The fade rates are of the same order. However, since the experimental sheets initially had a more intense image, the fade rate (e.g., as a percent per day of the initial intensity) was slightly greater for these receiving sheets than for commercial K-P sheets.

It should be noted that the rate of fade of images prepared as described herein is dependent to some extent on the intensity of the incident light. While the results reported herein were obtained using fluorescent indoor illumination of normal room intensity, it has also been observed that at higher illumination levels (such as sunlight), the fade rate of images formed on K-P CF sheets may be substantially increased (by a factor of about 10), whereas the images formed with CF sheets bearing the reduced charge bentonites described herein do not show a fade rate increase of similar magnitude (say a factor of about 3). It follows, therefore, that by selection of testing conditions, the relative performance of the systems may be altered. It has been our experience that, as disclosed herein, the sheets of the invention are substantially equivalent in fade resistance to K-P sheets when tested under the mild illumination conditions described, but that, at any higher illumination level, the reduced charge bentonite CF sheets of the invention are clearly superior in fade resistance to K-P sheets.

EXAMPLE II

This example illustrates another method for producing a pigment of the invention.

A. Preparation of Pigment

Fifteen hundred grams (moisture-free basis) of the dried, pulverized Dewitt bentonite of Example I was mixed with hydrochloric acid of 36% concentration to give a 30% solids slurry containing 1% HCl based on the slurry weight. This slurry was mixed for 30 minutes under a drill press and filtered and the cake was washed with 3600 ml. of water to yield 2650.6 g. of a 57.2% solids filter cake.

One portion of the cake was added to sufficient water under a drill press to produce a 30% solids slurry. To this slurry, lithium carbonate was added in amount of 3.70% based on the dry weight of the clay in the slurry. After 25 minutes' mixing the slurry was screened through 100, 200 and 325 mesh screens to remove grit and the resulting slurry was filtered and washed with water. The resulting cake was air dired, heated and comminuted as described for the sample of Example I.

The pigment product had a nitrogen B.E.T. surface area of about 69.6 $m^2/g$., particle size distribution 50% finer than about 1.8 mu e.s.d.; X-ray basal planar spacing was 10.0A.

Following is a partial chemical analysis of the pigment product.

| | Wt. % (L.O.I.-free basis) |
|---|---|
| Total $SiO_2$ | 66.59 |
| CaO | 0.96 |
| MgO | 2.34 |
| $Na_2O$ | 1.06 |
| $Li_2O$ | 1.25 |
| $K_2O$ | 0.78 |
| Free moisture, wt. % | 1.95 |
| L.O.I., wt. % | 7.96 |

B. Makedown and Coating

The procedure of Example I was followed.

C. Imaging Performance

The tests and results are reported in Table II.

TABLE II

| | Experimental CF Sheets | Resin Coated CF Sheets |
|---|---|---|
| 30 second initial sensitivity | 64.9 | 63.2 |
| 24 hour initial sensitivity | 60.1 | 64.3 |
| 6 hour board fade | 61.5 | 65.9 |
| 1 day board fade | 62.7 | 67.7 |
| 2 days board fade | 66.8 | 70.2 |
| 3 days board fade | 68.6 | 73.3 |
| 6 days board fade | 72.2 | 75.2 |
| 9 days board fade | 74.1 | 77.5 |

Equivalent or superior sensitivity and fade resistance are shown by data in Table II. In this case, a statistical regression analysis indicates a slightly lower percentage fade rate (i.e., greater fade resistance) for sheets sensitized with the pigment of the invention versus resin — the former fading at 4.56% per day, the latter at 4.61% per day. Given the uncertainty in the measurements, these results are considered to be equivalent.

EXAMPLE III

The procedures of Example I were repeated with a sample of the Texas No. 1 bentonite, using 120 g. lithium chloride and 500 g. of dried crude clay. The reduced charge montmorillonite pigment product contained 1.75% $Li_2O$.

This pigment was coated on paper as in Example I at a coat weight of 5.5 lbs./3000 ft.$^2$ and the resulting CF sheets were printed with the CB sheets of Example I (containing a solution of CVL as the sole chromogen). Results were generally similar to those reported in Table I.

EXAMPLE IV

This example illustrates the production of a reduced charge montmorillonite pigment from an alkaline earth bentonite clay by a preferred method in which the clay is ion-exchanged to hydrogen form, and then to lithium form before heat treatment and grinding.

A sample of the Dewitt clay was slurried at 30% solids in a solution of hydrochloric acid of 1.42% concentration. The resulting viscous but flowable slurry had a pH of 1.0. The slurry was mixed for ½ hour, filtered and washed with water to remove soluble salts. The damp filter cake at 47% solids was charged to a sigma-blade mixer. With the mixer in operation lithium carbonate was added in amount of 3.7% based on the dry weight of the clay, along with additional water to reduce clay solids to 31%. The mixture was pugged for about 40 minutes and discharged from the mixer. It was dried for 24 hours at room temperature and then calcined at about 220° C. for 24 hours. After calcination, the material was pulverized and ground in a fluid energy mill.

The use of the pigment of the invention in record material is covered by claims in a copending application of applicants that is being filed concurrently with the instant application.

We claim:

1. A sensitizing pigment for record material comprising micron-size particles of a mixed layer smectite, the lattice of which is partially dioctahedral montmorillonite and partially trioctahedral such as saponite or hectorite, and wherein the proportion of trioctahedral is small, said mixed layer smectite having been subjected to ion-exchange treatment with a preselected quantity of lithium ions followed by heat treamtnet to collapse irreversibly the dioctahedral montmorillonite structure, said particles being capable when coated on paper of producing a stable intense blue image when printed with a solution of crystal violet lactone in an organic solvent.

2. The pigment of claim 1 wherein said particles are essentially all finer than 15 microns and are predominatly in the size range of ½ to 5 microns.

3. The pigment of claim 2 wherein said particles contain from about 0.5% to 4% $Li_2O$ based on the weight of the particles after being heated to costant weight at 1800° F.

4. The pigment of claim 3 wherein said particles contain from about 0.8% to 3% $Li_2O$.

5. Finely divided particles of reduced charge dioctahedral montmorillonite clay pigment obtained by ion-exchanging a crude mixed layer smectite clay, the lattice of which is partially dioctahedral montmorillonite and partially trioctahedral such as saponite or hectorite, and wherein the smectite clay contains more than 70% dioctahedral montmorillonite, with from about 60 to 120 meq./100 g. of lithium ions, said crude clay containing less than about 7% by weight hydrated silica, heating the ion-exchanged clay at a temperature in the range of about 160°C. to 300° C. to collapse irreversibly the dioctahedral montmorillonite structure, and fluid energy milling the heated material, said pigment being capable when coated on paper of producing a stable intense blue color when contacted with a solution of crystal violet lactone in an organic solvent, said pigment being chracterized further by the fact that a conventional X-ray pattern exhibits a basal planar spacing at 9.4 to 10.7A. which does not increase when the pigment is exposed to saturated water vapor and an expansion to about 17.3A. when ethylene glycol is used, said pigment having a base exchange capacity in the range of 20 to 50 meq./100 g., a free moisture content in the range of 1 to 3% by weight, being capable of being prepared into a dispersed aqueous slurry which exhibits substantially Newtonian rheological behavior at a solids level of 40%, a surface area in the range of 40 to 80 m$^2$/g. as determined by nitrogen adsorption and a G.E. brightness of at least 60%.

6. The pigment of claim 5 wherein said particles contain from about 0.5% to 4% $Li_2O$, based on the weight of the particles after being heated to constant weight at 1800° F.

7. The pigment of claim 6 wherein said particles contain from about 0.8% to 3% $Li^2O$, based on the weight of the particles after being heated to constant weight at 1800° F.

8. A method for preparing a sensitized image-developing pigment for a record material system which comprises providing crude mixed layer smectite clay, the lattice of which is partially dioctahedral montmorillonite and partially trioctahedral such as saponite or hectorite, and wherein the smectite clay contains more than 70% dioctahedral montmorillonite, partially exchanging exchangeable cations in said clay with lithium ions in amount corresponding to from 60% to 125% of the baase-exchange capacity of the crude clay, said crude clay containing less than 7% by weight hydrated silica, heating the ion-exchanged clay at a temperature in the range of about 160° C. to 300° C. to collapse irreversibly the dioctahedral montmorillonite structure and then grinding the resulting partially reduced charge montmorillonite in a fluid energy mill until the partices are finer than 15 microns.

9. The method of claim 8 wherein sufficient lithium ions are added to produce said particles containing from 0.5 to 4% by weight $Li_2O$ based on the weight of the particles after being heated to constant weight at 1800° F.

10. The method of claim 8 wherein sufficient lithium ions are added to produce particles containing from about 0.8 to 3% by weight $Li_2O$.

11. A method for producing a pigment useful in the production of record material based on the use of an encapsulated solution of crystal violet lactone, which comprises providing a mixed layer smectite clay, the lattice of which is partially dioctahedral montmorillonite and partially trioctahedral such as hectorite or saponite, and wherein the clay contains more than 70% dioctahedral montmorillonite, said clay containing exchangeable alkaline earth cations, containing less than 7% hydrated silica and having a G.E. brightness above 60%, partially exchanging exchangeable cations in said clay with from about 60 to 120 meq./100 g. of lithium ions, heating the clay thus treated at a temperature in the range of 160° C. to 250° C. until the structure of the dioctahedral montmorillonite is collapsed, as evidenced by the fact that the product has a basal planar spacing in the range of about 9.6 to 10.0 A., and grinding in a fluid energy mill to produce particles of reactive pigment that are essentially all finer than 15 microns and predominantly in the size range of ½ to 5 microns.

12. A pigment mixture for sensitizing record material comprising a mixture of the pigment of claim 1 with a pigment selected from the group consisting of calcium carbonate, kaolin and mixtures thereof.

13. The pigment mixture of claim 12 which consists of the pigment of claim 1 with from about 30% to 40% by weight of kaolin clay.

14. The pigment mixture of claim 12 which consists of about 70 parts by weight of the pigment of claim 1, about 20 parts by weight of calcium carbonate and about 10 parts by weight of kaolin clay.

* * * * *

UNITED STATES PATENT AND TRADEMARK OFFICE
CERTIFICATE OF CORRECTION

PATENT NO. : 4,028,133
DATED : June 7, 1977
INVENTOR(S) : Peter A. H. Isaac and T. Dixon Oulton It is certified that error appears in the above-identified patent and that said Letters Patent are hereby corrected as shown below:

Column 10 - line 15, should read -- montmorillonite in the production of record material. --.

Column 11 - line 24, "patents mush have", should read
--patents must have--.
Column 14 - line 48, "1 mu qqThe basal", should read--1 mu. The basal--.

Signed and Sealed this

Twentieth Day of September 1977

[SEAL]

Attest:

RUTH C. MASON
Attesting Officer

LUTRELLE F. PARKER
Acting Commissioner of Patents and Trademarks